No. 779,340. Patented January 3, 1905.

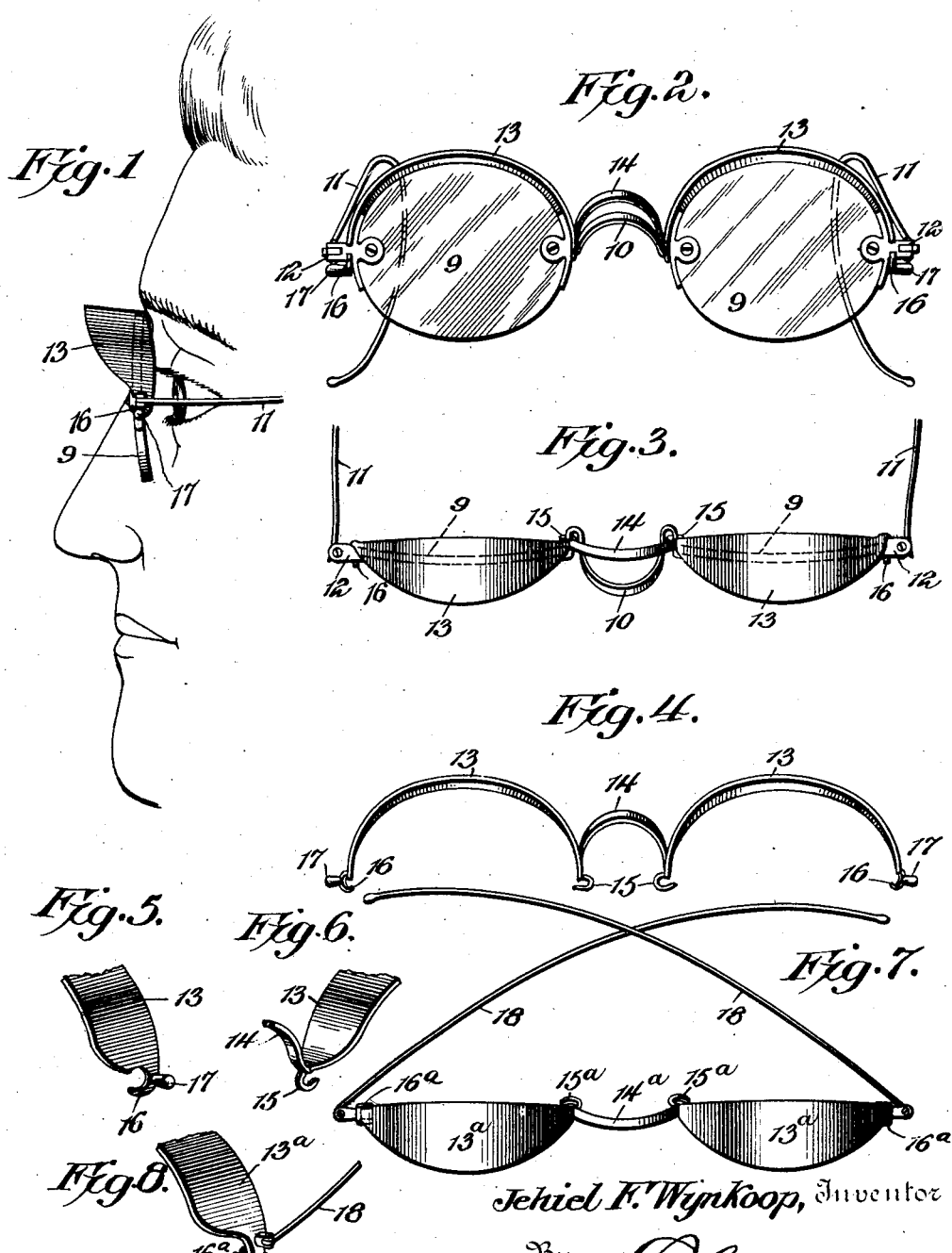

UNITED STATES PATENT OFFICE.

JEHIEL FRANKLIN WYNKOOP, OF MINNEAPOLIS, MINNESOTA.

SPECTACLE-SHADE.

SPECIFICATION forming part of Letters Patent No. 779,340, dated January 3, 1905.

Application filed February 13, 1904. Serial No. 193,447.

*To all whom it may concern:*

Be it known that I, JEHIEL FRANKLIN WYNKOOP, a citizen of the United States, residing at Minneapolis, in the county of Hennepin and State of Minnesota, have invented a new and useful Spectacle-Shade, of which the following is a specification.

The invention relates particularly to improvements in shades employed in connection with spectacles, and by the term "spectacles" is meant either eyeglasses or the kind in which temples are used.

The object is to provide a device of this character which may be securely attached to the spectacles and prevent the reflection and refraction of light, thus avoiding these objectionable features of glasses, which often arise from reading or working by artificial light.

In the drawings accompanying the specification and forming a part of the application, Figure 1 is a side elevation of a shade applied to spectacles and shown in place upon the user. Fig. 2 is a front elevation. Fig. 3 is a top plan view. Fig. 4 is a front elevation of the shade detached from the spectacles. Fig. 5 is a detail perspective view of the outer end of one of the shade elements. Fig. 6 is a similar view of the inner end. Fig. 7 is a top plan view of a slightly-modified form of construction wherein temples are employed. Fig. 8 is a detail perspective view of the outer end of one of the shade elements shown in Fig. 7.

Similar reference-numerals indicate corresponding parts in all the figures of the drawings.

In the embodiment illustrated in the first six figures the spectacles are of the rimless type, comprising lenses 9, connected by a nose-piece 10 and carrying temples 11, which are secured to the outer ends of the lenses by means of suitable posts 12. The shade comprises a pair of shade elements 13, which are preferably concavo-convex in form and are adapted to be curved to conform to and to rest upon the upper edges of the lenses. These shade members are preferably formed of some suitable sheet metal, though stiffened fabric or other material may be employed, if desired. Their inner ends are connected by a nose-piece 14, which is preferably disposed in upright relation, as shown. At the juncture of the nose-piece and shade members are located catches, preferably in the form of outwardly-turned yielding hooks 15, which are adapted to embrace the nose-piece 10 of the spectacles contiguous to the inner ends of the lenses. The outer ends of the shade elements are also provided with fastening devices in the form of yielding hooks 16, arranged to embrace the posts 12 of the spectacles, which hooks may be provided with suitable knobs 17 to permit the easy application or detachment of the shade. The entire structure may be formed of metal, if desired, and, indeed, can be constructed of a single piece, though this feature is not important. The inner faces of the shade elements are preferably darkened and are non-reflective. In using this device the hooks 15 are engaged upon the nose-piece 10 of the spectacles, and the shade elements are then bent to conform to the upper ends of the lenses, after which the outer hooks 16 are engaged about the posts 13. Thus when the spectacles are in use the light from above cannot strike the lenses, and all reflection and refraction is thereby prevented. Moreover, the device can be applied to spectacles of different sizes and forms, as the elements can readily bend, so that they will properly position themselves thereupon.

In Figs. 7 and 8 a slightly-modified form of construction is employed. In this construction the same shade elements and nose-piece 13ª and 14ª are shown, together with the inner fasteners 15ª. The outer ends of the shade members, however, instead of having forwardly-projecting hooks 16 preferably employ inwardly-extending hook elements 16ª, that are adapted to embrace the outer edges of lenses employed in eyeglasses. Further than this, said outer ends carry temples 18, which are hinged thereto, and thus properly position the shade with respect to the lenses, besides holding the eyeglasses. This modified form, as will be apparent, acts in exactly the same way as that first described, by effecting the shielding of the lenses from direct rays of light. It will be apparent that the front and rear edges of the shade elements can be of different contours, and the latter may be formed to fit the brow of the wearer.

Having thus described my invention, what I claim as new, and desire to secure by Letters Patent, is—

1. In a shade of the class described, the combination with curved shade elements that conform substantially to the upper edge of a pair of spectacles, of fastening devices located at the inner ends of the shade elements and arranged to detachably engage the nose-piece of the spectacles.

2. In a shade of the class described, the combination with concavo-convex shade elements that conform substantially to the upper edge of a pair of spectacles, of a nose-piece connecting the elements, and fastening devices located at the juncture of the nose-piece and elements and arranged to detachably engage the nose-piece of the spectacles.

3. In a shade of the class described, the combination with shade elements arranged to be fitted upon spectacle-lenses, of devices for connecting the elements to the nose-piece of said spectacles, and devices for attaching the outer ends to spectacles.

4. In a shade of the class described, the combination with shade elements constructed to conform substantially to the upper edges of spectacle-lenses, of a nose-piece connecting the shade elements, yielding catches for engaging the nose-piece of said spectacles, and yielding catches carried by the outer ends of the lenses for engaging with the spectacles.

5. In a shade of the class described, the combination with shade elements constructed to conform substantially to the upper edges of spectacle-lenses, of a nose-piece connecting the same, outwardly-turned hooks disposed at the juncture of the nose-piece and elements and arranged to engage the nose-piece of the spectacles, and yielding catches carried by the outer ends of the lenses for engaging with the spectacles.

6. In a shade of the class described, the combination with a shade member, of a device carried thereby and arranged to detachably engage the nose-piece of a pair of spectacles, and temples also carried by the shade member.

7. In a shade of the class described, the combination with shade elements, of a nose-piece connecting the elements, fastening devices located at the juncture of the nose-piece and shade elements, said fastening devices being arranged to detachably engage the nose-piece of a pair of spectacles, and temples carried by the outer ends of the shade elements.

In testimony that I claim the foregoing as my own I have hereto affixed my signature in the presence of two witnesses.

JEHIEL FRANKLIN WYNKOOP.

Witnesses:
T. C. SHOVE,
HESTER M. SHOVE.